United States Patent
Denker

(10) Patent No.: US 8,131,840 B1
(45) Date of Patent: Mar. 6, 2012

(54) SYSTEMS AND METHODS FOR DATA STREAM ANALYSIS USING EMBEDDED DESIGN LOGIC

(75) Inventor: Richard E. Denker, Portland, OR (US)

(73) Assignee: Packet Plus, Inc., Portland, OR (US)

( * ) Notice: Subject to any disclaimer, the term of this patent is extended or adjusted under 35 U.S.C. 154(b) by 379 days.

(21) Appl. No.: 11/853,990

(22) Filed: Sep. 12, 2007

Related U.S. Application Data

(60) Provisional application No. 60/844,303, filed on Sep. 12, 2006.

(51) Int. Cl.
*G06F 15/173* (2006.01)

(52) U.S. Cl. ........ 709/224; 709/200; 709/223; 709/231; 370/252

(58) Field of Classification Search .................. 709/200, 709/223, 224, 231; 370/252
See application file for complete search history.

(56) References Cited

U.S. PATENT DOCUMENTS

| | | |
|---|---|---|
| 5,185,882 A | 2/1993 | White, Jr. et al. |
| 5,331,571 A | 7/1994 | Aronoff et al. |
| 5,418,972 A | 5/1995 | Takeuchi et al. |
| 5,488,688 A | 1/1996 | Gonzales et al. |
| 5,640,542 A | 6/1997 | Whitsel et al. |
| 5,898,862 A | 4/1999 | Vajapey |
| 5,954,824 A | 9/1999 | Cherichetti et al. |
| 5,978,584 A | 11/1999 | Nishibata et al. |
| 6,230,119 B1 | 5/2001 | Mitchell |
| 6,233,673 B1 | 5/2001 | Higashida |
| 6,289,300 B1 | 9/2001 | Brannick et al. |
| 6,553,419 B1 * | 4/2003 | Ram ............................ 709/224 |
| 6,560,739 B1 | 5/2003 | Chung |
| 6,925,406 B2 | 8/2005 | Kellerman et al. |
| 6,931,574 B1 | 8/2005 | Coupal et al. |
| 6,956,394 B2 | 10/2005 | Limaye et al. |
| 7,036,062 B2 | 4/2006 | Morris et al. |
| 7,043,668 B1 | 5/2006 | Treue et al. |
| 7,099,438 B2 | 8/2006 | Rancu et al. |
| 7,134,116 B1 | 11/2006 | Thekkath et al. |
| 7,237,033 B2 * | 6/2007 | Weigand et al. ............. 709/231 |
| 2004/0034492 A1 * | 2/2004 | Conway ......................... 702/81 |
| 2004/0136327 A1 * | 7/2004 | Sitaraman et al. ........... 370/252 |
| 2007/0127389 A1 * | 6/2007 | Klotz et al. ................... 370/252 |
| 2008/0052394 A1 * | 2/2008 | Bugenhagen et al. ........ 709/224 |
| 2008/0259809 A1 * | 10/2008 | Stephan et al. .............. 370/252 |

* cited by examiner

*Primary Examiner* — Yves Dalencourt
(74) *Attorney, Agent, or Firm* — Stoel Rives LLP

(57) ABSTRACT

Systems and methods are provided for analyzing a data stream device at a packet level. In one embodiment, design logic is embedded within a target data stream processing device such as a networking device or video device. The embedded design logic is configured to start and stop the target data stream processing device and to inject data into the target data stream processing device for evaluation. The embedded design may also be configured to detect a user selected data value in a packet within the target data stream processing device before the packet is transmitted through the device's physical layer or passed up the device's networking stack. In addition, or in another embodiment, at least a portion of the design logic, including the ability to detect the user selected value in the packet, may be located external to the data stream processing device. In one embodiment, a controlled client/server interfaces with the physical layer of the target data stream processing device and provides packet-level analysis of the data stream.

22 Claims, 13 Drawing Sheets

Send value is loaded into load register in output path.
Expected response is loaded into expected result check register in input path.
Expected time is loaded into count down (timeout) register.

SYSTEMS AND METHODS FOR DATA STREAM ANALYSIS USING EMBEDDED DESIGN LOGIC

RELATED APPLICATIONS

This application claims the benefit under 35 U.S.C. §119 (e) of U.S. Provisional Application No. 60/844,303, filed Sep. 12, 2006, which is hereby incorporated by reference herein in its entirety.

TECHNICAL FIELD

The present disclosure is related to the development, design and/or evaluation of data stream processing devices. More specifically, this disclosure provides systems and methods for controlling and evaluating data stream processing devices at the packet level.

BACKGROUND INFORMATION

Data stream processing devices are generally complicated. Networking device engineers, for example, typically use a knowledge of analog hardware, digital hardware, and software to develop networking devices. Such devices typically include analog hardware for implementing a physical layer of a networking protocol, digital hardware layers just above the physical layer for performance, and software layers above the hardware layers to provide flexibility.

There are many networking protocols that are used or optimized for different application attributes. The number of protocols is proliferating at a rapid rate, and many existing protocols are continually being upgraded to faster versions. Because of this continual change, networking test tools are not keeping up. In other words, known approaches to the design and development of networking device testing tools are too slow, complicated and expensive for the tools to be available for testing new networking devices in a timely manner.

Reasons for inadequate design and development approaches include test architectures that match that of a target network device, development dependencies, and lack of sharing across companies. A typical known architecture for network test equipment mimics that of the target networking device being tested, but with additional precision and control. This generally implies that it will be expensive to develop the test equipment and that the test equipment will be available later than the target networking devices to be tested.

To lower the development costs for test equipment, standard components may be used. This creates a dependency that delays when the test equipment can be available. For example, if a standard radio chip (e.g., wireless transceiver integrated circuit) is used, the radio chip must be completed before test equipment can be completed. If, a custom radio chip is developed instead, it eliminates the dependency, but increases the development costs. Current tools are not meeting the schedule requirements of development engineers, because of these delays.

Companies are attacking this initial test problem individually. There is no standard interface or other sharing of technology to leverage investment. As each new generation of network devices emerges, the initial testing needs force a re-invention of a testing solution. Most commonly, that testing solution is a custom-built version of the very product that is in development and requires testing. These custom-built tools are typically hard to use, poorly maintained, and expensive to develop.

BRIEF DESCRIPTION OF THE DRAWINGS

Non-limiting and non-exhaustive embodiments of the disclosure are described, including various embodiments of the disclosure with reference to the figures, in which.

DETAILED DESCRIPTION

I. Overview

Figure 1:
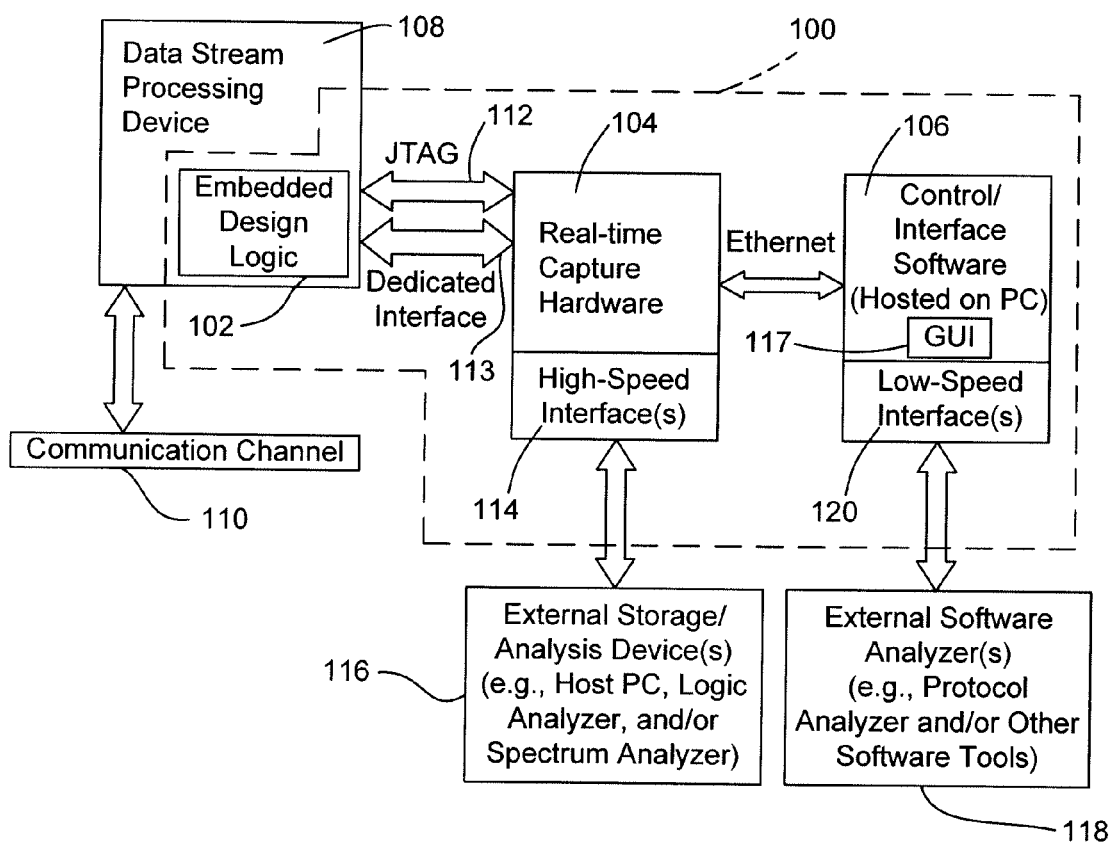
FIG. 1 is a simplified block diagram illustrating a packet-level analysis architecture according to one embodiment.

Methods and systems disclosed herein provide for analyzing data stream processing devices during and after the development of such devices. Data stream processing devices may include, for example, networking devices, video devices, and other devices configured to transmit and/or receive data streams. There are several phases between development and deployment of a network device. For example, quality assurance (QA) takes a design after it is complete and tests it for performance to specification (e.g., compliance with overall system or protocol performance). There are also manufacturing tests that check to see that a manufactured unit matches specification. Further, there may be benchmarking that compares the performance of multiple different units. In one embodiment, a data stream analysis tool provides a user, such as a networking device development engineer, features and flexibility by using an architecture that leverages the capabilities of the target data stream processing device (the device to be tested) to provide more efficient, timely and effective analysis than previously available.

In certain such embodiments, design logic is integrated into the target data stream processing device's hardware stack so as to provide access for the data stream analysis tool. As discussed in detail below, the complexity of the embedded design logic may vary depending on a particular application. The embedded design logic leads to lower development cost and faster development time because the architecture of the external data stream analysis tool is simplified. Further, the embedded design logic provides internal access that enables unique capabilities such as the use of a physical layer (PHY) of the target device, packet level control of traffic, and decryption of encrypted packets. As used herein, a "packet" is a broad term that includes a formatted block of data carried by a network. Thus, a packet may include, for example, a TCP/IP packet, a UDP/IP datagram, or a frame or other header-defined block of data in a video stream.

In one embodiment, the embedded design logic provides data insertion into the target data stream processing device. Thus, in addition to data traffic through the PHY of the target data stream processing device, the embedded design logic provides an ability to insert arbitrary traffic into the target data stream processing device without first going through the device's PHY. The target data stream processing device may then provide the inserted traffic onto a network through its PHY, or the target data stream processing device may pass the inserted data up its hardware and software stack in order to evaluate the device's hardware and/or software design. The embedded design logic also provides controlled stopping and starting of traffic, monitoring of traffic for a particular condition, logging of traffic, and other features and advantages that will become apparent in view of the description herein.

The systems and methods described herein by way of example embodiments are useful for network equipment design engineers, as well as QA, test and customer support engineers, for example. For example, the embodiments disclosed herein may be used by a design engineer when debugging a new design or investigating an issue with a current design. A problem may be re-created in a controlled manner, and additional information may then be gathered by stepping through the execution of several potential paths of logic. When a potential fix is implemented, the described system and methods provide for stepping through the execution of test cases to confirm that a fix actually corrects the problem.

As another example, the embodiments disclosed herein may be used for QA to provide the ability to synchronize a new design of a data stream processing device into a larger controlled architecture. Thus, the embodiments disclosed herein may be used for debugging larger configurations. In one embodiment, multiple target data stream processing devices may be synchronized together to help bridge to larger controlled architectures.

By way of another example, customer support engineers may use various embodiments disclosed herein to investigate an issue that is being experienced by a customer. Thus, the embodiments may increase the capacity of a debugging product to allow extended running in a customer environment to detect hard to re-create intermittent issues. In one embodiment, an analysis tool may monitor the data traffic in real-time, checking for specific conditions in the data traffic. In certain embodiments, the analysis tool may also log the traffic where there appears to be a problem. It may also insert small portions of traffic to develop a test case that can re-create the problem. In addition, or in other embodiments, the analysis tool may execute small pre-written test cases to aid in the investigation of a problem situation. These and other techniques may be implemented under software control in conjunction with the hardware architecture described herein. Further, such embodiments may be used during manufacturing to integrate short digital tests with an analog test that provides characterization.

In one embodiment, the data stream analysis tool provides efficient design partitioning. Performance dependent portions of the data stream analysis tool may be placed in the embedded design logic. Thus, this portion of the design is easily updated when the data stream processing device is revised. For example, a new chip process or a new speed FPGA will inherit the benefits of previous versions. This will minimize the change needed in the embedded design logic.

Networking protocol dependent portions of the design are implemented in software or programmable logic. This eliminates the delays associated with fabrication cycles when building a version of the product for a different protocol. This also makes the real-time capture hardware protocol independent and therefore usable for different protocols that are of similar speed.

A standard interface between the embedded design logic and the real-time capture hardware allows the real-time capture hardware to be used by multiple users or companies and to be developed before the target data stream processing device is complete. Having the data stream analysis tool during the design bring up stage provides significant value to designers. This is a time when it is unclear what parts of the design currently work and many parts of the design are suspect. Thus, a proven tool that can provide some unambiguous measurements is very valuable.

Certain embodiments disclosed herein provide a simplified design of a data stream analysis tool. The design is simpler because several portions of the data stream analysis tool are used from the target data stream processing device, instead of being duplicated. This speeds the development time of the data stream analysis tool and lowers costs. Specifically, the PHY of a data stream processing device is an analog function that typically requires calibration. By using the PHY from the target data stream processing device, this part of the design does not need to be separately built or calibrated. Also, often the PHY for a typical analysis tool needs to be measured to see its effect on the test results. However, by using the PHY from the target data stream processing device, a designer already knows the PHY's effect on data passing therethrough.

Parts of the target data stream processing device are also leveraged instead of being duplicated. For example, networking designs generally include circuitry to handle congestion and overflow situations. Instead of building separate circuitry and describing how the separate circuitry may affect results, the circuitry from the target networking processing device is used.

Also, by using the target circuitry, the amount of coordination that is required between the design under test and the data stream analysis tool is minimized. For example, by using a clock from the target data stream processing device, the circuitry used to compare and synchronize the clocking may be eliminated.

In certain embodiments, the data stream analysis tool provides access to internal information of target data stream processing device. Having a portion of the data stream analysis tool on the target data stream processing device provides the ability to access internal information of the target data stream processing device. For example, the dynamic keys that are used for encryption are accessible through the embedded design logic. To generate these dynamic keys in a timely fashion without this access may otherwise require supercomputer level computing, and there may still be lost information every time a key changes.

In certain embodiments, the data stream analysis tool provides through target radio traffic generation. With the ability to inject traffic through a target radio, test cases and testing scenarios may be conveniently built without creating a custom firmware build or other disturbance of the target design. This can be used to create tests of the radio characteristics. Test stimulus creation may be as simple as stepping packet-by-packet through a protocol exchange that was previously written. Also, certain packets may be inserted between tests that are used by the data stream analysis tool to provide convenient sequencing of a set of tests and to help isolate within which test an error occurred.

In certain embodiments, the data stream analysis tool provides for staging an initial development of a data stream processing device. The data stream analysis tool may be designed with the goal of bringing up an initial hardware design of a data stream processing device. The development of the data stream analysis tool itself may be staged to match this capability. For example, a data stream analysis tool may support three stages including PHY only, PHY plus encryption, and full design. However, a target data stream processing device may not be built with this phasing in mind. Even if such phasing is considered, all or portions of the logic to support this may be left out of the target data stream processing device because of size or complexity. By having much of the logic off-target, this risk is minimized.

In certain embodiments, the data stream analysis tool is flexible and configurable. Since in the early design stages the target data stream processing device has not been built yet, the amount of embedded design logic that is included on the target data stream processing device may be matched to the number of debug tools desired. For example, for an early revision of a design, there may be more debug logic and memory to allow the data stream analysis tool to gather maximum information. When the production version is built, there may be less debug logic and memory because comparatively less information needs to be gathered at this stage. This is especially true for FPGA based designs or other designs that can be changed relatively easily.

In certain embodiments, the data stream analysis tool provides packet level control. This level of abstraction matches the level that, for example, a protocol design engineer generally thinks on. Thus, translations between, for example, a software instruction level and the packet level are not required. Also, a control point may be placed in the hardware pipeline where it makes the most sense. This avoids intervening levels of logic that may be in an unknown state when the control point does not match the hardware pipeline, such as a control point at the software level.

In certain embodiments, the data stream analysis tool provides consistent interface across protocols. By providing control that is not protocol dependent, the control may be in common across protocols. This is very useful for multi-protocol projects.

In certain embodiments, the data stream analysis tool provides an interface to designs in development. By using the ability to modify the speed of the effective traffic input and output, this will enable the tool to interface to new designs that are running on an emulated hardware design such as a Cadence emulation system available from Cadence Design Systems, Inc. of San Jose, Calif. These designs run much slower than the real-time performance of the final system. This may require an input and output path that bypasses the parts of the system that cannot function properly at less than real-time operation such as the PHY layer.

In certain embodiments, the data stream analysis tool provides flexibility to a user when making design of tool decisions. The design decisions may include, for example, the amount of embedded design logic to include in the data stream processing device, the method of transmission of encryption keys to the real-time capture hardware, the connection between the embedded design logic and the real-time capture hardware (e.g., the number of signals and speed required to transmit the information), the inward traffic that bypasses the PHY, the connection to other test equipment (e.g., protocol analyzers, etc.), and other design decisions discussed herein. For example, the data stream analysis tool allows a user to increases the flexibility of the test equipment by reducing the amount of embedded design logic integrated into the data stream processing device. Further, for example, there are a number of ways to implement the transmission of encryption keys to the capture hardware depending on the user's concern about security and/or performance considerations of a dynamic change to a key during operation.

The embodiments of the disclosure may be best understood by reference to the drawings, wherein like parts are designated by like numerals throughout. It will be readily understood that the components of the disclosed embodiments, as generally described and illustrated in the figures herein, could be arranged and designed in a wide variety of different configurations. Thus, the following detailed description of the embodiments of the systems and methods of the disclosure is not intended to limit the scope of the disclosure, as claimed, but is merely representative of possible embodiments of the disclosure. In addition, the steps of a method do not necessarily need to be executed in any specific order, or even sequentially, nor need the steps be executed only once, unless otherwise specified.

In some cases, well-known features, structures or operations are not shown or described in detail. Furthermore, the described features, structures, or operations may be combined in any suitable manner in one or more embodiments. It will also be readily understood that the components of the embodiments as generally described and illustrated in the figures herein could be arranged and designed in a wide variety of different configurations.

Embodiments may be provided as a computer program product including a machine-readable medium having stored thereon instructions that may be used to program a computer (or other electronic device) to perform processes described herein. The machine-readable medium may include, but is not limited to, hard drives, floppy diskettes, optical disks, CD-ROMs, DVD-ROMs, ROMs, RAMs, EPROMs, EEPROMs, magnetic or optical cards, solid-state memory devices, or other types of media/machine-readable medium suitable for storing electronic instructions.

II. Data Stream Analysis Architecture

FIG. 1 is a simplified block diagram illustrating an architecture of a data stream analysis tool 100 according to one embodiment. For illustrative purposes, the data stream analysis tool 100 is shown within a dashed line. The data stream analysis tool 100 includes an embedded design logic 102, real-time capture hardware 104, and control/interface software 106.

The embedded design logic 102 is implemented into the target data stream processing device 108 such that it co-exists with and leverages the target data stream processing device's hardware and/or software capabilities. For example, in the case of a chip target design, a register-transfer-level (RTL) description may be provided that can be synthesized into the larger design using standard design tools. The embedded design logic 102 has access to the device's networking stack, but it has little or no impact on the performance of the target data stream processing device 108 until the data stream analysis tool 100 asserts a stop (halt) command during a test.

The target data stream processing device 108 may include, for example, a router, a network switch, a network access point, a wired network interface card (e.g., Ethernet adapter), a wireless network interface or adapter, a file server, a database server, a network storage device, an interactive television, a multimedia set-top-box or other video device for receiving and/or transmitting a video data stream, or any other device configured to communicate a data stream through a network communication channel 110. For example, the target data stream processing device may include a mobile phone, laptop computer, personal computer (PC), personal digital assistant (PDA), or other handheld device capable of establishing a wireless or wired connection to a local area network (LAN), a wide area network (WAN), a cable television (CATV) network, a satellite television transmission, the Internet, or other connection services and network variations such as the world wide web, the public internet, a private internet, a private computer network, a secure internet, a private network, a public network, a value-added network, combinations of the foregoing, or the like.

In certain embodiments, the embedded design logic 102 is configurable to enable increased capacity and performance if desired by a particular user. For example, in comparatively low data rate embodiments (e.g., using a wireless data link such as IEEE 802.11), the embedded design logic 102 may export data to the real-time capture hardware 104 using one or more pins in an existing interface (e.g., through an existing Joint Test Access Group (JTAG) interface 112). However, as discussed in detail below, the target data stream processing device 108 may also include a dedicated interface 113 such as a high-density connector at its edge that provides a connection to the real-time capture hardware 104.

The real-time capture hardware 104 communicates with both the embedded design logic 102 and the control/interface software 106, and includes high-speed logic, buffering, and timing circuitry for testing and data capture operations. In certain embodiments, the real-time capture hardware 104 provides parallel task execution to increase the performance to that of the target data stream processing device 108 being tested. As discussed in detail below, the real-time capture hardware 104 is configured to provide high-speed, parallel processing of data received from the embedded design logic 102.

To quickly offload the gathered information, the real-time capture hardware 104 may include a high-speed communications interface 114, such as a Gigabit Ethernet interface, between the capture hardware 104 and an external storage/analysis device 116 that includes, for example, a host PC, a logic analyzer, a spectrum analyzer, or another data recording and/or analyzing device. In certain embodiments, the capture hardware 104 is re-programmable to re-target to different protocols. However, the actual hardware may be the same for all comparable speed protocols.

In one embodiment, the control/interface software 106 is hosted on a PC or other computing device, and provides a graphic user interface (GUI) 117 for the set-up and control of the embedded design logic 102 and/or the real-time capture hardware 104, such as loading test cases. The control/interface software 106 manages non-performance critical tasks such as formatting and re-ordering of packet information. The GUI 117 facilitates field-oriented, logical input of packet information into the target data stream processing device 108. In one embodiment, the control/interface software 106 interfaces with external software analyzers 118 through one or more low speed interfaces 120. The external software analyzers 118 may include, for example, protocol analyzers and/or other software tools.

Figure 2:
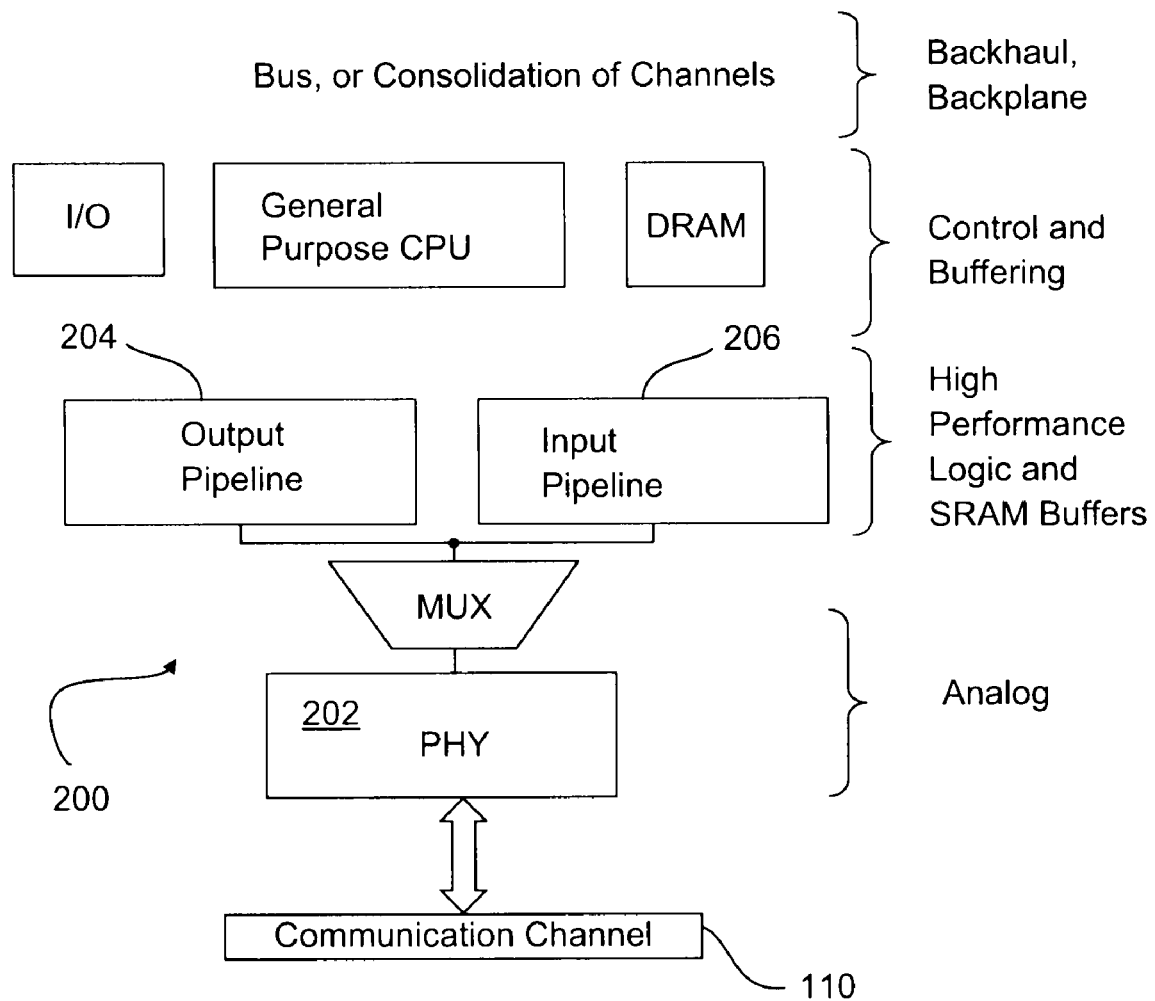
FIG. 2 is a simplified block diagram of a typical architecture 200 for a data stream processing device.

FIG. 2 is a simplified block diagram of a typical architecture 200 for a data stream processing device, such as the target data stream processing device 108 shown in FIG. 1. The typical networking architecture 200 has a physical interface layer or PHY 202 that communicates data packets through a network communication channel 110. For example, the PHY 202 may include an Ethernet adapter for communicating with a wired network and/or a radio for communicating with a wireless network. The PHY 202 includes the analog portion of the data stream processing device's design and is generally separated from the rest of the design. Because of the number of prototypes required to develop a successful design, the PHY 202 may be implemented in a separate device from the rest of the target data stream processing device 108.

There are typically two paths through the target data stream processing device 108, one for input and one for output. Generally, these paths are implemented as first in, first out (FIFO) buffers or other pipeline structures to maximize or increase the performance of the network communication channel 110. In FIG. 2, the paths are represented as an output pipeline 204 and an input pipeline 206. The output pipeline 204 and input pipeline 206 generally include high performance logic and buffers, e.g., SRAM. As discussed in detail below, the embedded design logic 102 according to certain embodiments is built around the generally common characteristics of the separation of the physical layer 202 from the rest of the target data stream processing device 108 and the separate input and output paths 204, 206.

Figure 3:
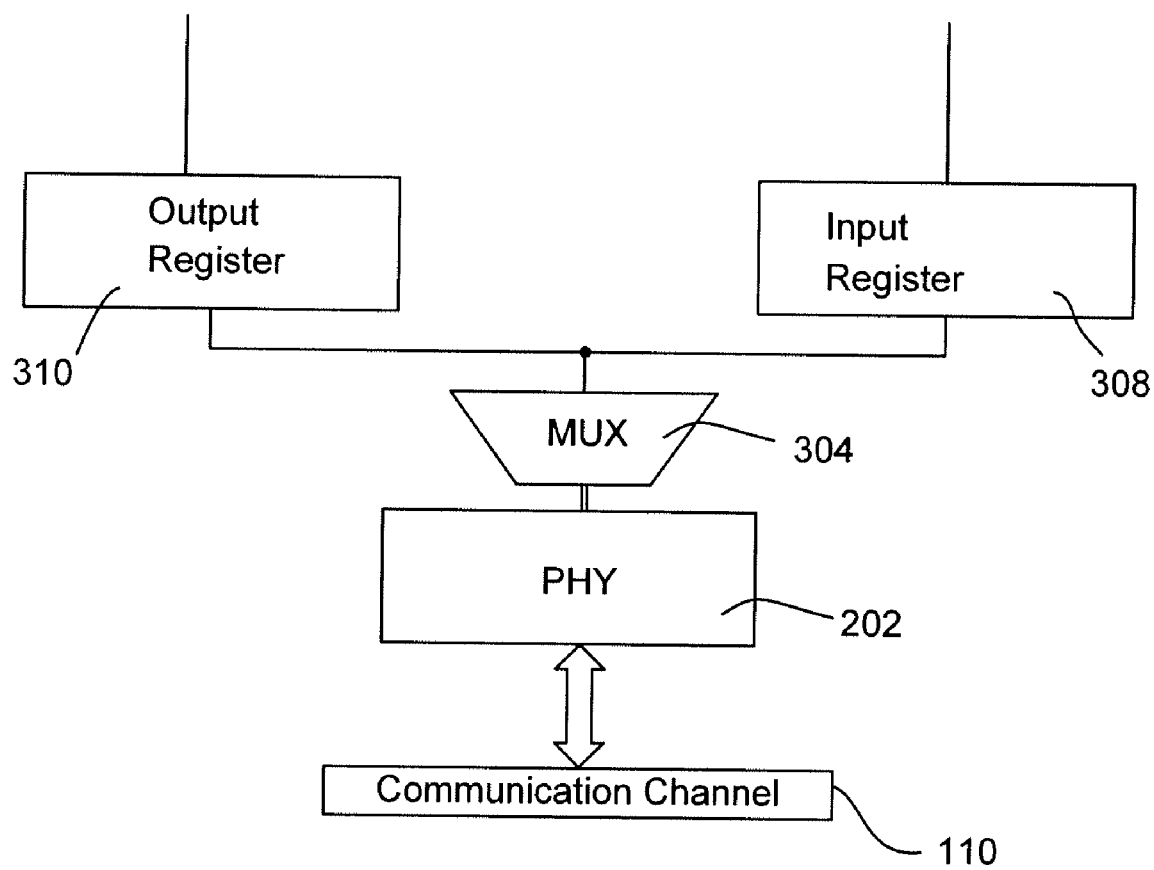
FIG. 3 is a simplified block diagram illustrating an input/output (I/O) structure of a typical data stream processing device.

FIG. 3 is a simplified block diagram illustrating an input/output (I/O) structure of a typical data stream processing device. The I/O structure includes a multiplexer (MUX) 304 configured to share the PHY 202 between an input register 308 and an output register 310. The MUX 304 directs the information on the appropriate path (input or output). An artisan will recognize from the disclosure herein that the MUX 304 (as shown in FIGS. 3, 4, 6, 7 and 10) applies to a simplex communication channel and that in other embodiments, including half duplex and full duplex communication channels, the MUX 304 and/or its function may be included as part of the PHY 202. Information received from the network communication channel 110 via the PHY 202 is loaded into the input register 308. Information to be sent out to the network communication channel 110 via the PHY 202 is loaded into the output register 310. The embedded design logic 102 integrates with these structures, as described below.

III. Example Embedded Design Logic in the Output Path

Figure 4:
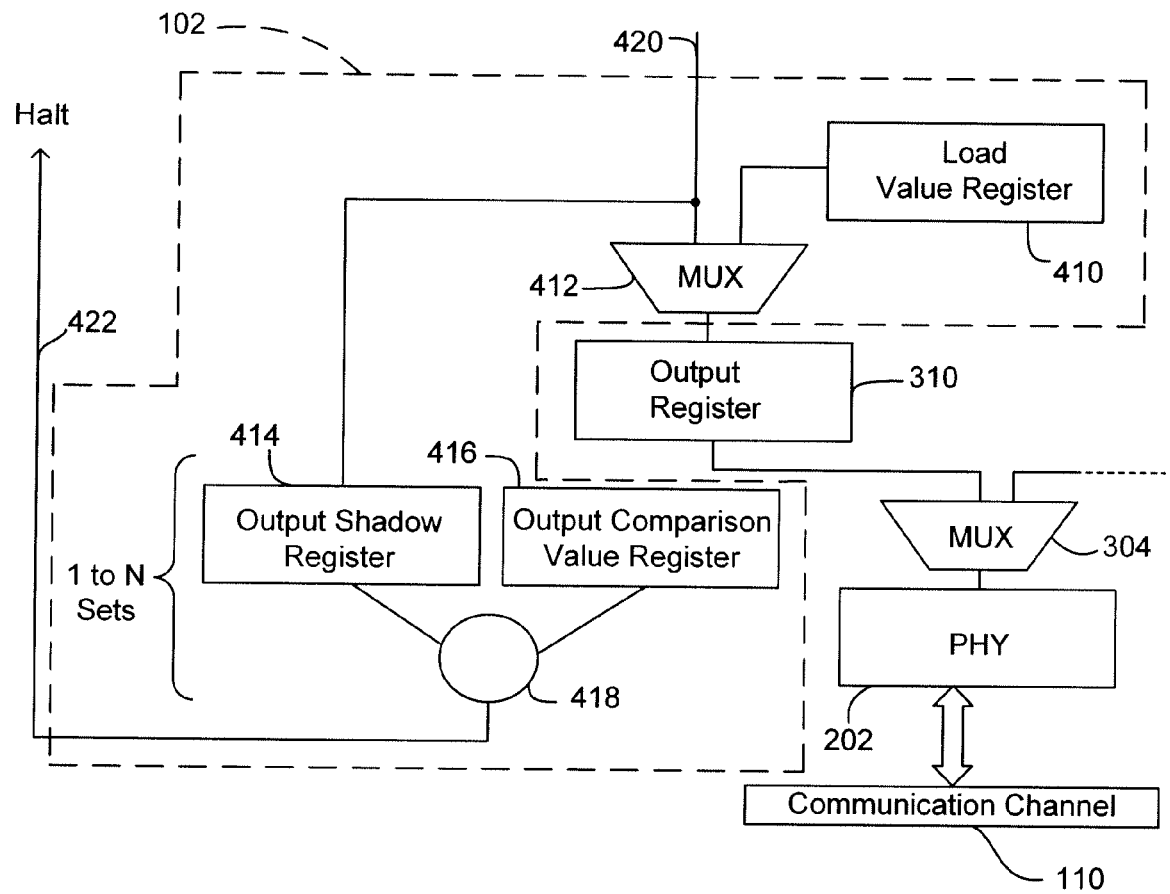
FIG. 4 is a simplified block diagram illustrating elements of embedded design logic in an output path of a target data stream processing device according to one embodiment.

FIG. 4 is a simplified block diagram illustrating elements of embedded design logic 102 in an output path of the target data stream processing device 108 according to one embodiment. The illustrated portions of the embedded design logic 102 (shown within a dashed line) include a load value register 410, a MUX 412, an output shadow register 414, an output comparison value register 416, and comparison logic 418. The MUX 412 selects data to load into the output register 310 from either the target data stream processing device 108 via path 420 or from the load value register 410. This allows the insertion of user selected or arbitrary traffic that transmits through the target data stream processing device's PHY 202 to the network communication channel 110. The inserted traffic may also be an edited version of traffic that was to be output. This allows a convenient trial of "what if" scenarios.

In one embodiment, the effective speed of the traffic can also be modified for the interface to different speed devices. This can be done by delaying each packet by a prescribed amount.

The data from the target data stream processing device 108 via path 420 is routed to both the output register 310 (via the MUX 412) and the output shadow register 414. Therefore, when the MUX 412 selects the data from the path 420, the output shadow register 414 contains the same value that is loaded into the output register 310. The comparison logic 418 compares the value in the output shadow register 414 against a test value in the output comparison value register 416 to determine whether a halt signal 422 should be set to stop the target data stream processing device 108 from generating additional output through the PHY 202 to the network communication channel 110. In certain embodiments, multiple sets (illustrated as "1 to N sets" in FIG. 4) of output shadow registers 414 and output comparison value registers 416 may be configured to allow a halt for multiple conditions.

In one embodiment, at least a portion of the embedded design logic 102 shown in FIG. 4 may be included in the real-time capture hardware 104 shown in FIG. 1 rather than being integrated within the data stream processing device 108. For example, the output shadow register 414, the output comparison value register 416 and the comparison logic 418 may be located in the real-time capture hardware 104 or in another device external to the data stream processing device 108. Such an embodiment may be used, for example, at comparatively lower data rates (e.g., approximately 500 Mbits/second or less) where a few pins (e.g., approximately four or less) may be used to export part or all of the data stream from the target data stream processing device 108. An artisan will recognize from the disclosure herein, however, that such an embodiment may be used with any data rate with a number of pins, depending on the particular application. Thus, the embedded design logic 102 may be reduced or minimized to reduce production costs and increase flexibility in the data stream analysis tool 100.

Figure 5:
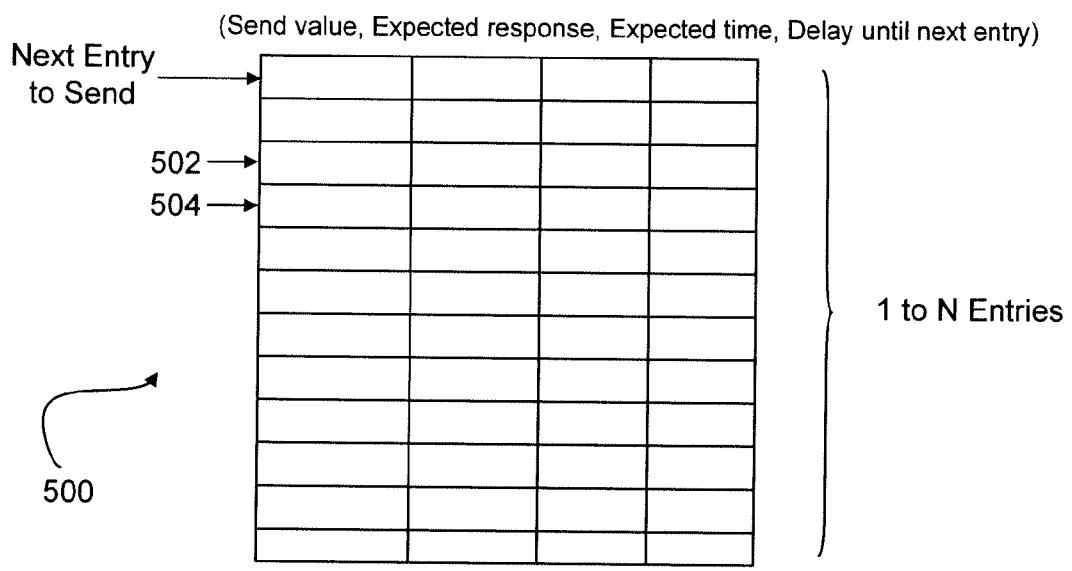
FIG. 5 graphically illustrates a transmit test table according to one embodiment.

FIG. 5 graphically illustrates a transmit test table 500 according to one embodiment. To build a primitive sequence of commands, the transmit test table 500 is used to execute a set of frames in a controlled way. For each entry (row 502, 504, etc.), a send value is placed into the load value register 410 in the output path. An expected response to the send value is also loaded in a check register 618 (FIG. 6) on the input path, as explained below. An expected response time is loaded into a timeout counter (not shown). If the expected response is received within the expected response time, the test proceeds to the next entry in the transmit test table 500. A halt entry is entered into the transmit test table 500 to indicate stopping the transmission and for repeating from the first entry. If a timeout condition occurs the test is terminated.

To conserve space on the target data stream processing device 108, according to one embodiment, the value that is loaded into the load value register 410 may be a short code that represents one of several packet options. For example, a code of one may represent a packet with all ones ("11111111") and a code of two may represent alternating ones and zeroes ("10101010").

IV. Example Embedded Design Logic in the Input Path

Figure 6:
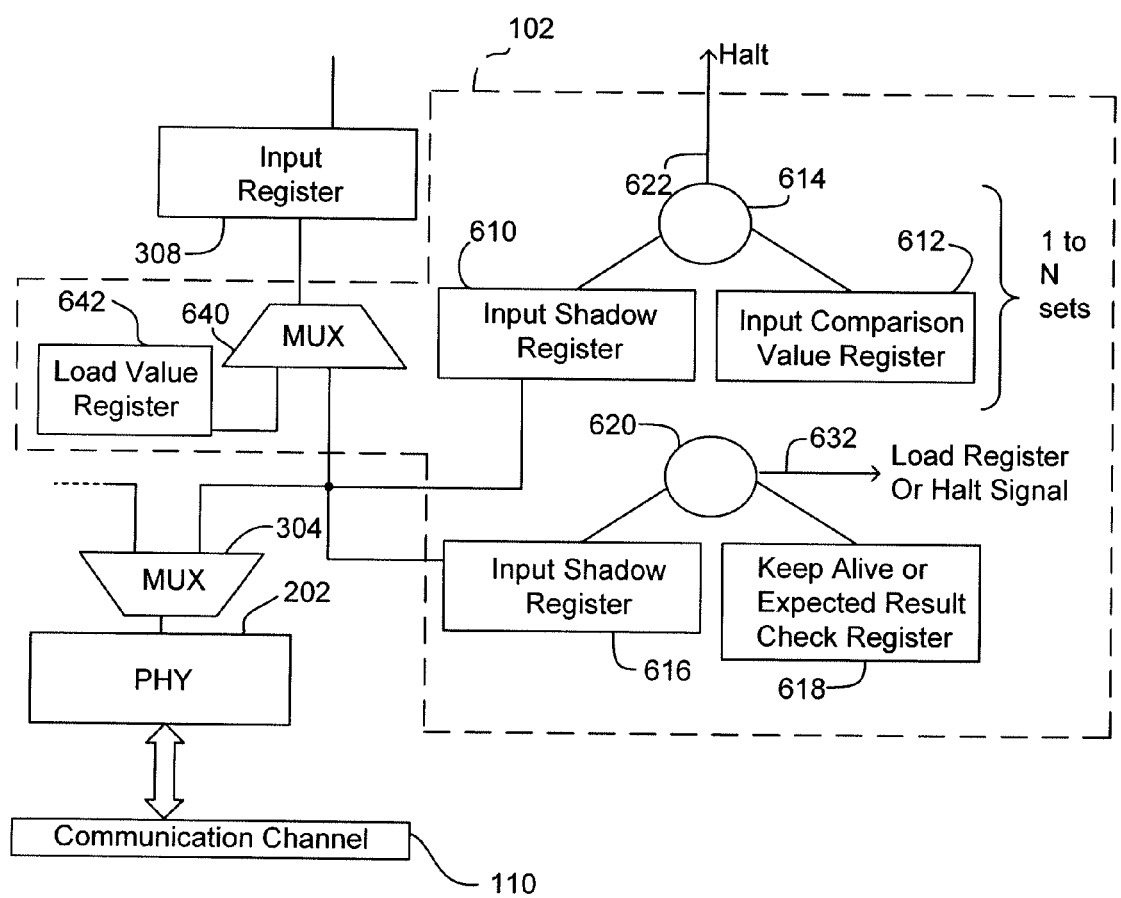
FIG. 6 is a simplified block diagram illustrating elements of embedded design logic in an input path of a target data stream processing device according to one embodiment.

FIG. 6 is a simplified block diagram illustrating elements of embedded design logic 102 in an input path of the target data stream processing device 108 according to one embodiment. The illustrated portions of the embedded design logic 102 (shown within a dashed line) include a first input shadow register 610 and an input comparison value register 612 electrically connected to first comparison logic 614, and a second input shadow register 616 and a check register 618 electrically connected to second comparison logic 620.

The value from the network PHY 202 may be routed to both the input register 308 and the first shadow register 610. The first comparison logic 614 compares the value in the first shadow register 610 against a test value in the input comparison value register 612 to determine whether the halt signal 622 should be asserted to stop additional input from the network communication channel 110 to the input register 308 through the PHY 202 and MUX 304. Multiple sets (illustrated as "1 to N sets" in FIG. 6) of first input shadow registers 610 and input comparison value registers 612 may be configured to allow a halt for multiple conditions.

In one embodiment, the second input shadow register 616 is also loaded with the same value loaded into the input register 308. The second comparison logic 620 compares the second input shadow register 616 against the check register 618 to check for polling message needs (keep alive) and for expected results during the transmission of a test.

Certain protocols periodically poll devices to determine whether the devices are still connected to the network. If a particular device does not respond to the poll, the device's connection to the network may be terminated. Thus, in one embodiment, when a halt condition has been given and the user has configured the data stream analysis tool 100 to keep connections alive, the second comparison logic 620 waits for a polling message to be loaded into the input shadow register 616. When the second comparison logic 620 detects the polling message, it loads a response into the output load value register 410 via signal 632.

When a test is being transmitted, as discussed above, the expected result is loaded into the check register 618 for subsequent comparison with an actual response of the transmission, which is loaded into the second input shadow register 616 when it is received from the communication channel 110. If the expected result is not received, the halt signal is asserted. In addition, or in other embodiments, the halt signal may also be asserted if the actual response does not match the expected result.

In one embodiment, the embedded design logic 102 also includes logic for injecting data into the target data stream processing device's input path. For example, as shown in FIG. 6, the embedded design logic 102 may include a MUX 640 electrically connected to the MUX 304 and a load value register 642. The MUX 640 is configured to select whether data from the PHY 202 or the load value register 642 is provided to the input register 308 for further processing by the target data stream processing device 108. This allows the insertion of arbitrary traffic that will input through the input register 308. The traffic could also be an edited version of the traffic that was to be input. This allows the convenient trial of different "what if" scenarios.

The effective speed of the traffic can also be modified for the interface to different speed devices. This can be done by delaying each packet by a prescribed amount, or holding the packet and sending at a higher rate.

In one embodiment, at least a portion of the embedded design logic 102 shown in FIG. 6 may be included in the real-time capture hardware 104 shown in FIG. 1 rather than being integrated within the data stream processing device 108. For example, the first input shadow register 610, the input comparison value register 612, and the comparison logic 614 may be located in the real-time capture hardware 104 or in another device external to the data stream processing device 108. Such an embodiment may be used, for example, at comparatively lower data rates (e.g., approximately 500 Mbits/second or less) where a few pins (e.g., approximately four or less) may be used to export part or all of the data stream from the target data stream processing device 108. An artisan will recognize from the disclosure herein, however, that such an embodiment may be used with any data rate and/or number of pins, depending on the particular application. Thus, the embedded design logic 102 may be reduced or minimized to reduce production costs and increase flexibility in the data stream analysis tool 100.

V. Example Embedded Design Logic for Logging Data

Figure 7:
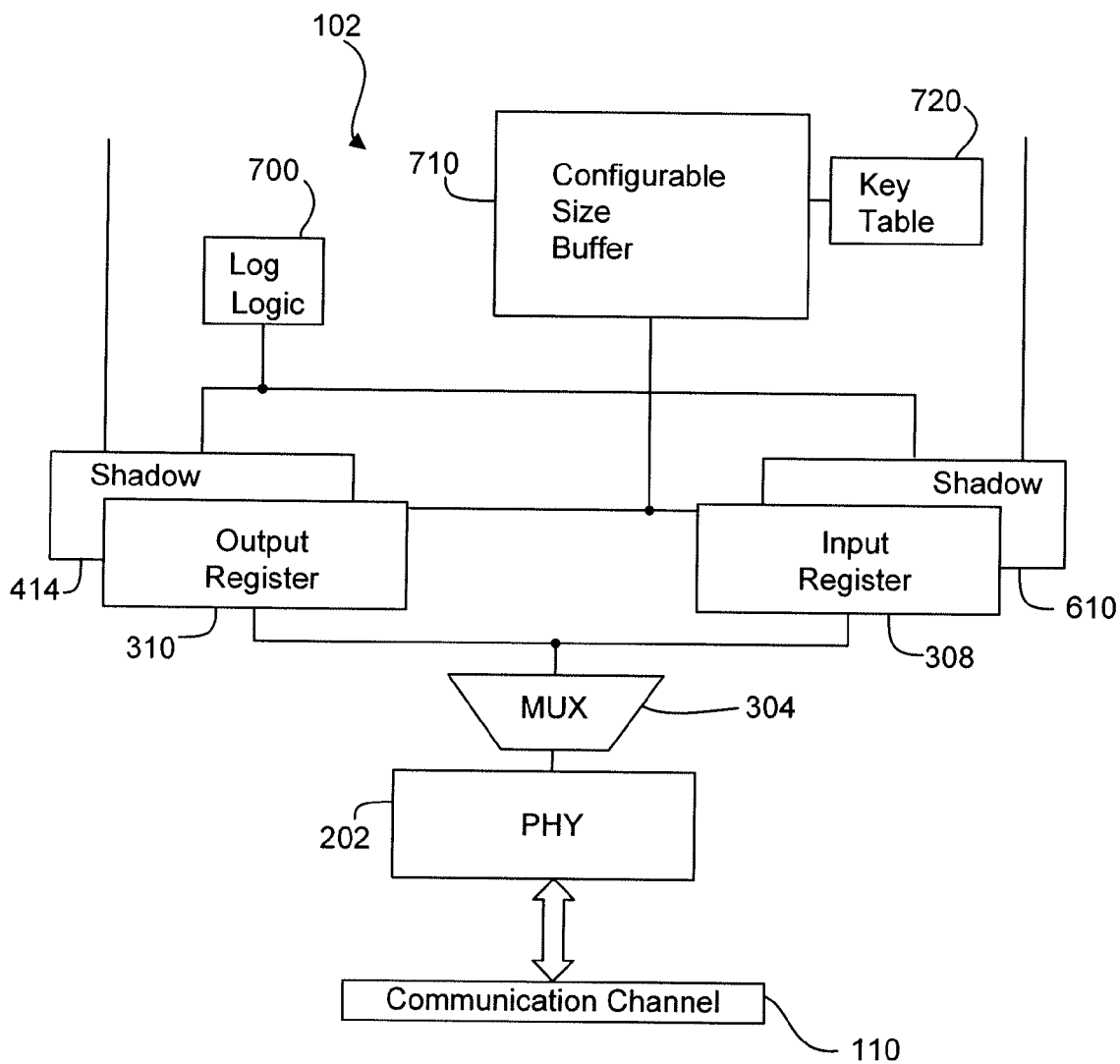
FIG. 7 is a simplified block diagram illustrating elements of embedded design logic in a target data stream processing device for logging data according to one embodiment.

FIG. 7 is a simplified block diagram illustrating elements of embedded design logic 102 in the target data stream processing device 108 for logging data according to one embodiment. The illustrated portions of the embedded design logic 102 include the shadow registers 414, 610 discussed above, log logic 700, a buffer 710, and a key table 720. The log logic 700 checks whether a condition exists that directs the current packet to be logged. Both input traffic and output traffic may be logged. If the log logic 700 determines that the current packet is to be logged, then a time corresponding to when the packet was sent or received, an encryption key used to encrypt the packet, and the packet are saved into the on-chip buffer 710. The size of the buffer 710 is configurable. In one embodiment, the key table 720 includes a table of active keys used to decrypt the logged packet.

Figure 8:
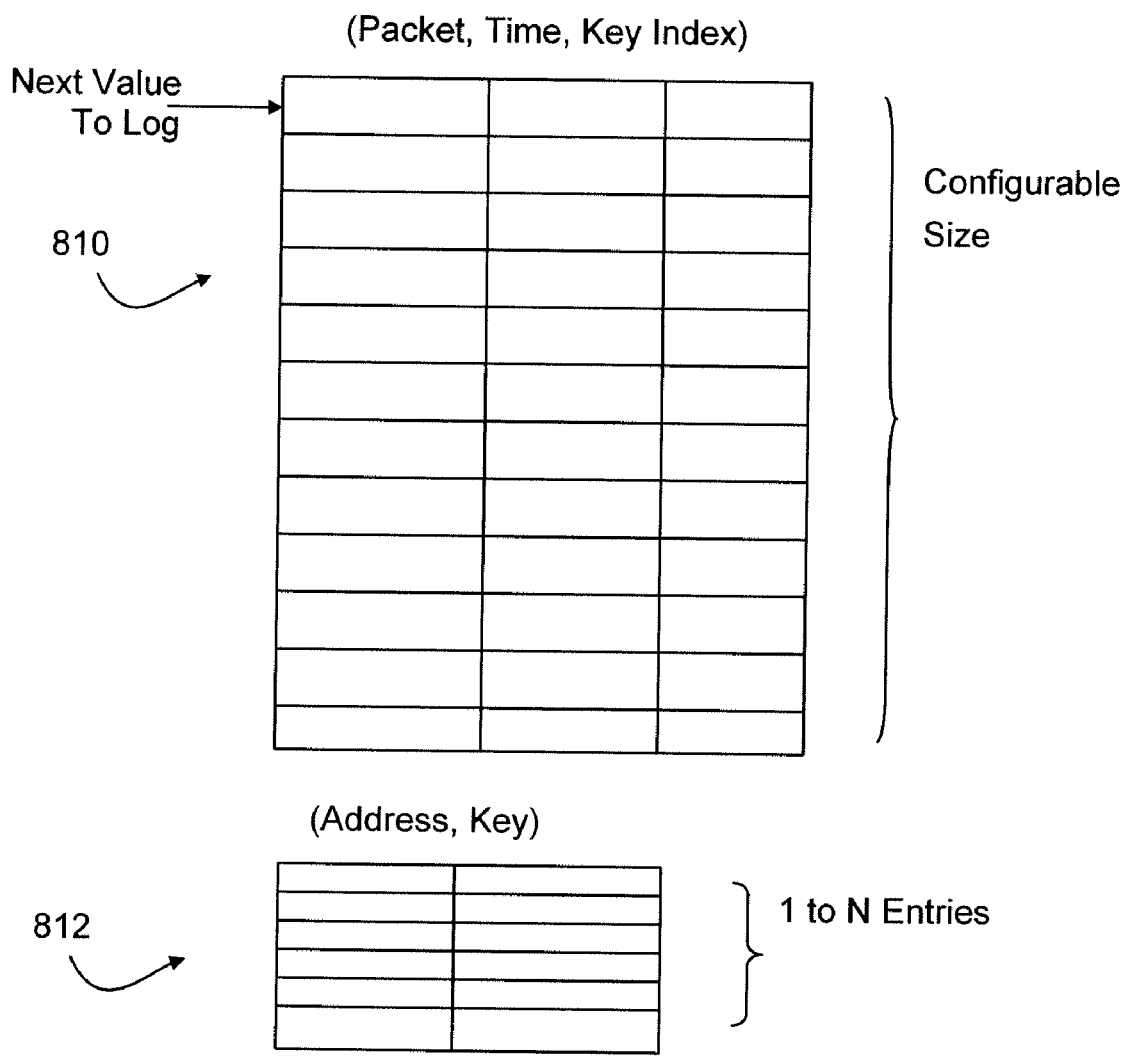
FIG. 8 graphically illustrates simplified example log structures according to one embodiment.

FIG. 8 graphically illustrates simplified example log structures according to one embodiment. For each packet that is logged, the following information is saved in a size configurable log structure 810: the packet, the time that the packet was sent or received, and an index into the encryption key table 720. A table 812 of active keys is kept for decryption purposes. In the table 812, the key that is being used with a destination address is maintained. The index is used to save space and obfuscate the key.

Figure 9:
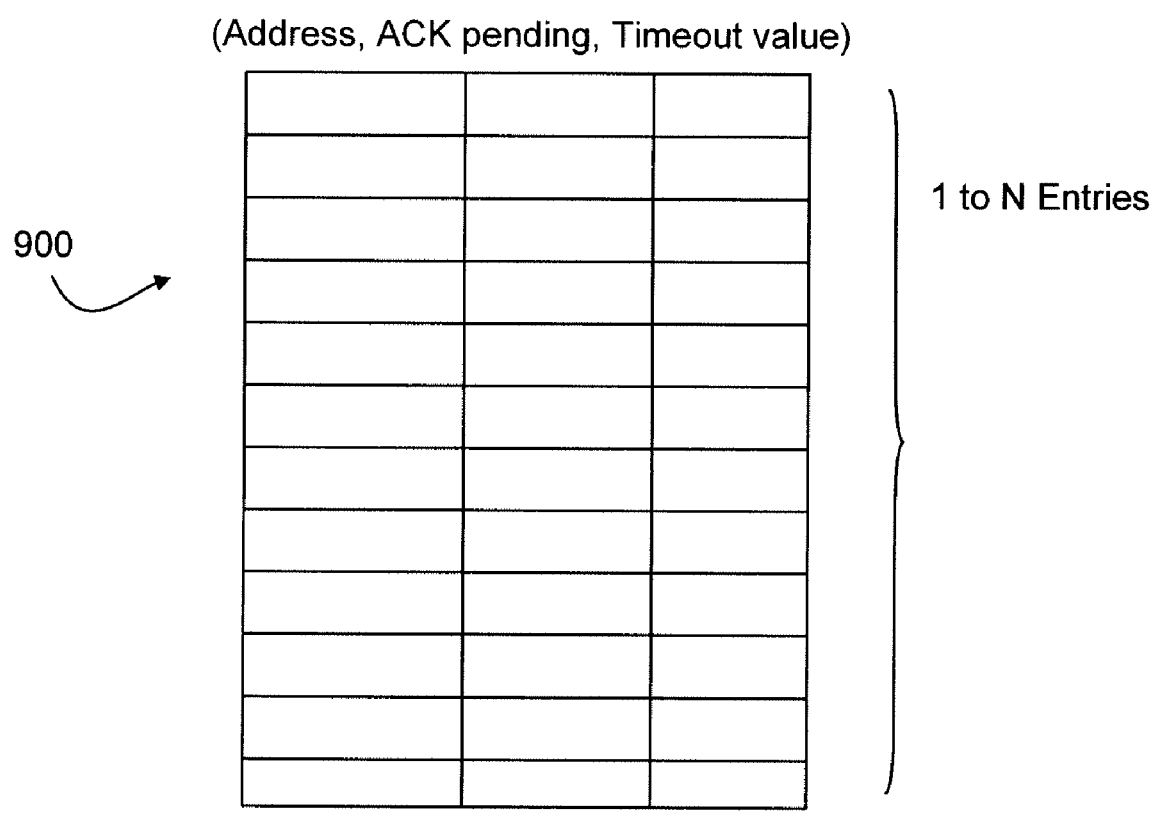
FIG. 9 graphically illustrates an example ACK timeout table according to one embodiment.

FIG. 9 graphically illustrates an example ACK timeout table 900 according to one embodiment. For every conversation that the target network device 108 has underway, the ACK timeout table 900 tracks the status of acknowledgement messages. The ACK timeout table 900 is periodically checked to see if a timeout has occurred. In certain embodiments, the ACK timeout table 900 need only be implemented for protocols that require acknowledge (ACK) messages.

VI. Example Packet Gap Check Hardware

Figure 10:
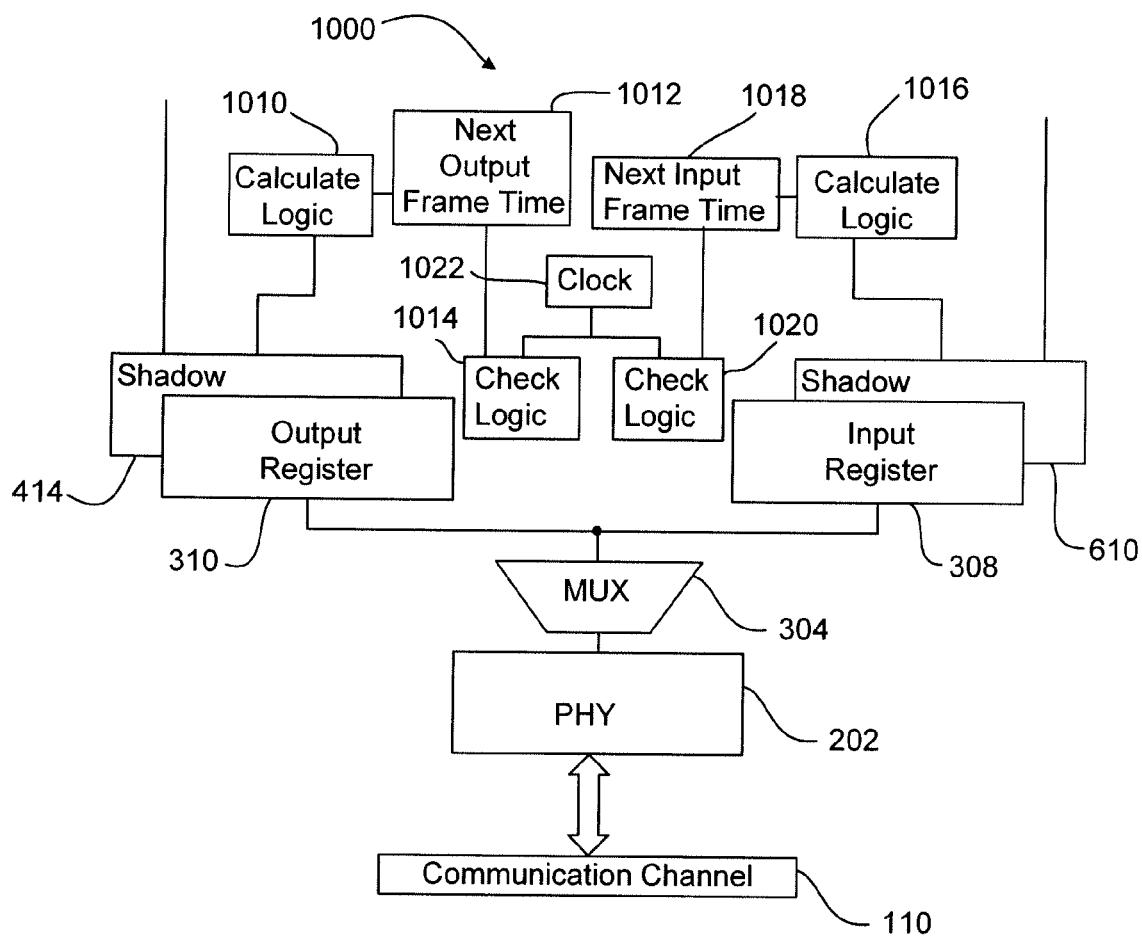
FIG. 10 is a block diagram of example packet gap check hardware embedded in a target network device according to one embodiment.

FIG. 10 is a block diagram of example packet gap check hardware 1000 embedded in the target network device 108 according to one embodiment. The packet gap check hardware 1000 includes the shadow registers 414, 610 discussed above, output calculate logic 1010, next output time frame register 1012, output check logic 1014, input calculate logic 1016, next input time frame register 1018, input check logic 1020, and a clock 1022.

The packet gap check hardware 1000 checks that the correct gap between packets is maintained. For each packet that is sent or received, the calculate logic 1010, 1016 calculates the earliest time for the next packet and saves the value in the corresponding next output frame time register 1012, 1018. Then, the corresponding check logic 1014, 1020 checks the next packet for the correct gap between packets. When an error condition is detected, it will be appropriately logged. In addition, or in other embodiments, an error condition may trigger a halt of the target network device 108.

Figure 11:
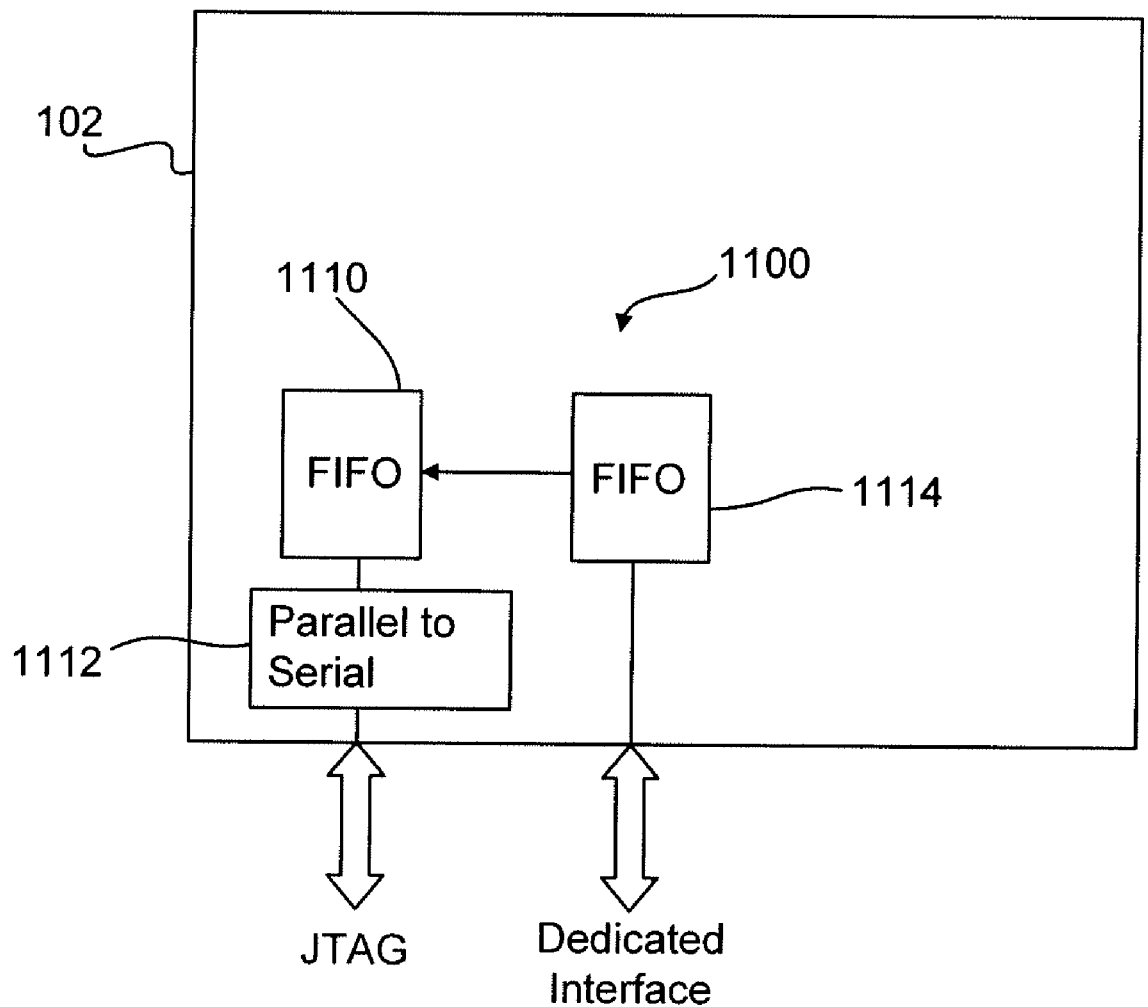
FIG. 11 is a simplified block diagram of an example packet I/O structure according to one embodiment.

VII. Example Interface Between Embedded Design Logic and Real-Time Capture Hardware FIG. 11 is a simplified block diagram of an example packet I/O structure 1100 according to one embodiment. As shown, the output of the embedded design logic 102 to the real-time capture hardware 104 may be through a Joint Test Access Group (JTAG) interface that includes a first FIFO buffer 1110 and a parallel to serial converter 1112. In certain embodiments, JTAG is a four signal serial interface. In such embodiments, the parallel to serial converter 1112 is configured to convert data to JTAG's serial interface.

JTAG provides a useful interface because it is used in many hardware designs and provides available pins that may be used during the design and test of the target network device 108, as disclosed herein. Thus, few or no additional pins may be required to export data from the embedded design logic 102 to the real-time capture hardware 104. Of course, an artisan will recognize from the disclosure herein that this disclosure is not limited to JTAG and that any other available pins or interface may also be used.

The four pins generally available through the JTAG interface may be sufficient to export data to the real-time capture hardware when the target data stream processing device 108 is operating at a low data rate (e.g., up to approximately 500 Mbits/second). If the target data stream processing device 108 is operating at a comparatively higher data rate, an additional set of signals may be configured through an additional interface, such as the dedicated interface 113 shown in FIG. 1.

VIII. Example Real-Time Capture Hardware

Figure 12:
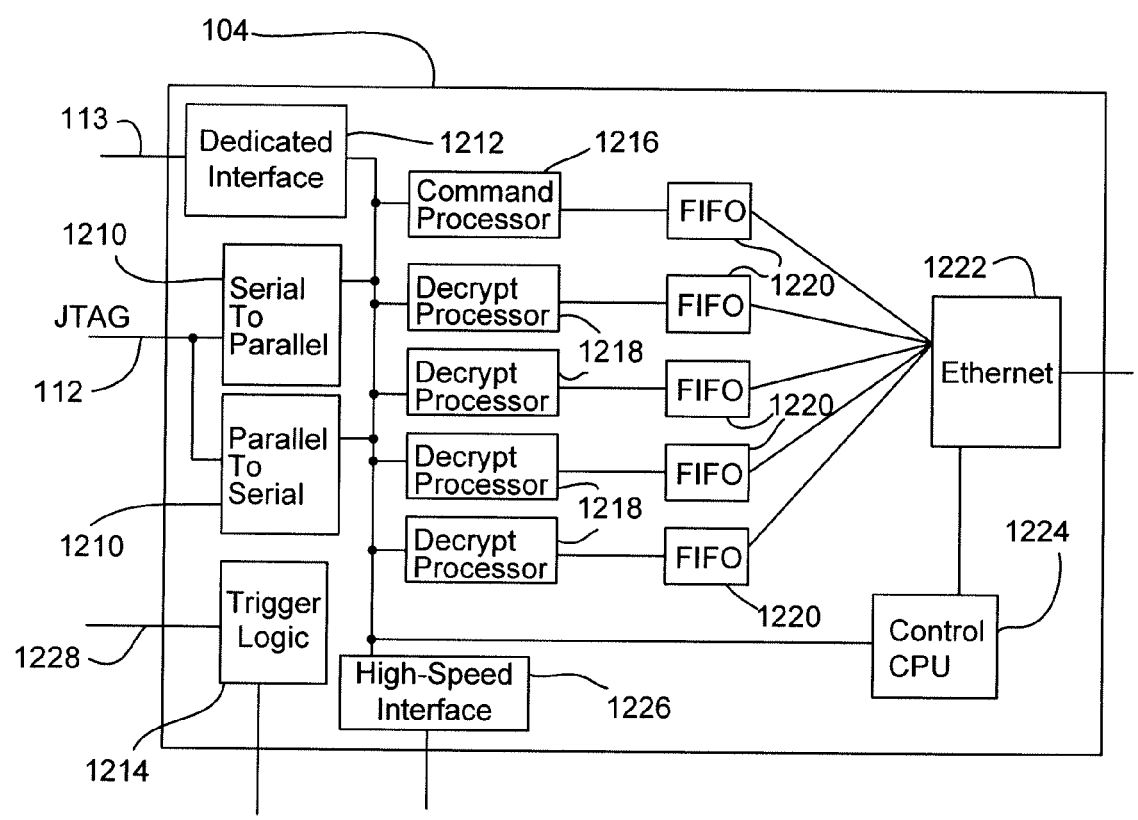
FIG. 12 is a block diagram of example real-time capture hardware according to one embodiment.

FIG. 12 is a block diagram of example real-time capture hardware 104 according to one embodiment. The real-time capture hardware 104 efficiently buffers and processes the data exported from the embedded design logic 102. The real-time capture hardware 104 includes serial to parallel converters 1210 (two shown) electrically connected to the JTAG interface 112, an additional or dedicated interface 1212 electrically connected to the dedicated interface 113, trigger logic 1214, a command processor 1216, a plurality of decryption processors 1218 (four shown), a plurality of FIFO buffers 1220 (five shown), an Ethernet interface 1222, a control CPU 1224 and a high-speed interface 1226.

The serial to parallel converters 1210 and/or dedicated interface 1212 allocate packets to the plurality of processors 1216, 1218 to efficiently handle the load of decryption of the packets. Since the packets are time-stamped, the real-time capture hardware 104 does not need to maintain the order of the packets according to certain embodiments. Rather, in such embodiments, the control/interface software 106 handles re-ordering the packets for display on the GUI 117.

As shown in FIG. 12, the command processor 1216 sorts out and processes commands from the embedded design logic 102 separately from encrypted data.

The direct access trigger logic 1214 receives a value directly from the target network device (e.g., through a shared or dedicated pin 1228) and presents the value to a logic analyzer or other test device to be monitored. A trigger from the logic analyzer is passed directly back to the embedded design logic 102 to halt additional traffic. In another embodiment, the trigger from the logic analyzer passes through the trigger logic 1214 to the embedded design logic 102.

The control CPU 1224 processes input from the control/interface software 106. Such input may include commands to set the value or query the registers in the embedded design logic 102, as discussed above. In the embedded design logic 102, the registers may be connected by JTAG to facilitate access.

The high-speed interface 1226 receives data from the serial to parallel converters 1210 and/or the dedicated interface 1212, and provides the data to external test equipment such as a logic analyzer or spectrum analyzer.

The modification of the speed of the traffic input/output allows the testing of a design function at different speeds. This allows a developer to determine at what speed a design breaks down.

In one embodiment, when the target data stream processing device is halted, any additional incoming traffic is buffered to the real-time capture hardware 104. When execution is resumed, the execution can proceed either from the traffic that has been buffered or from the data stream interface.

IX. Controlled Client/Server Data Stream Analysis

Figure 13:
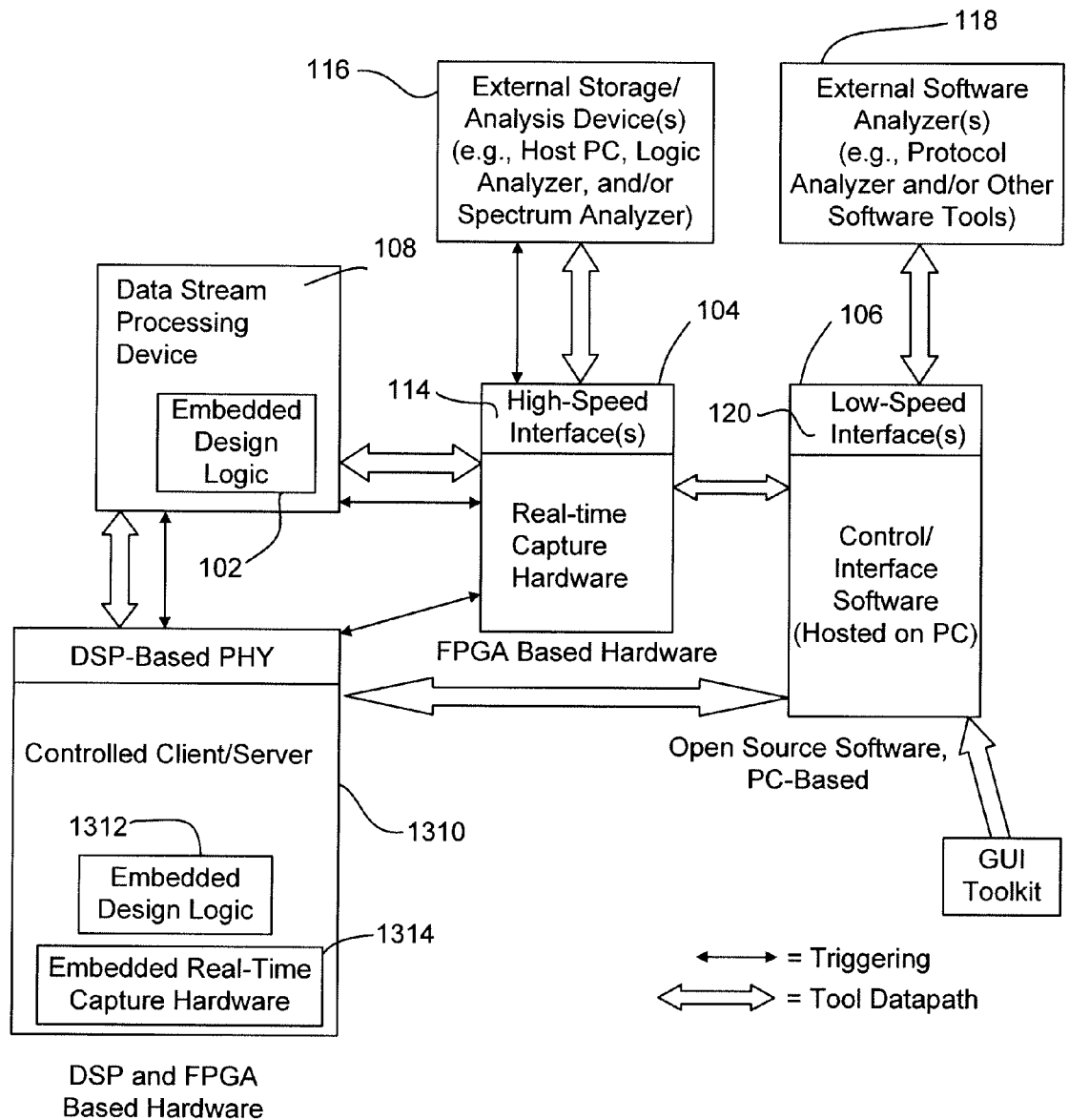
FIG. 13 is a simplified block diagram illustrating an architecture of a data stream analysis tool that includes a controlled client/server according to one embodiment

FIG. 13 is a simplified block diagram illustrating an architecture of a data stream analysis tool, such as the data stream analysis tool 100 shown in FIG. 1, that includes a controlled client/server 1310 according to one embodiment. The controlled client/server 1310 includes embedded design logic 1312 and embedded real-time capture hardware 1314. In one embodiment, the embedded design logic 1312 is configured to perform the same functions as the embedded design logic 102 discussed above. Similarly, the embedded real-time capture hardware 1314 may be configured to perform the same functions as the real-time capture hardware 104 discussed above.

The incorporation of the embedded design logic 1312 and the embedded real-time capture hardware 1314 into a client or server 1310 that is having a conversation with the data stream processing device 108 allows both sides of the conversation to be controlled. Thus, the controlled client/server 1310 may provide the same control features and display that is available for the data stream processing device 108 side of the conversation. Further, having complete control of the client/server side of the conversation allows a phased adoption of the data stream analysis tool 100 architecture by allowing a user such as a network device engineer to decide how much of the embedded design logic 102 to incorporate into the data stream processing device 108.

For example, the different levels of embedded design logic 102 to incorporate in the data stream processing device 108 may include: (1) none, (2) triggering, (3) logging, and (4) full stop/start control. For the case of no embedded design logic 102 incorporated in the data stream processing device 108, the controlled client/server 1310 controls the communication of the data stream between the respective PHYs of the data stream processing device 108 and the controlled client server 1310 because for many protocol exchanges stopping one side of the exchange is sufficient to stop the other side of the exchange stopped while it waits for a response. Thus, the controlled client/server 1310 may be used in some embodiments even with no changes to the data stream processing device 108.

For the case of embedded design logic 102 that supports triggering, the size impact to the data stream processing device 108 is minimal. For example, the embedded design logic 102 may require only the routing of a signal or signals to an external pin of the data stream processing device 108. Generally, interesting conditions are already detected by the data stream processing device 108 such as a CRC error or other error condition. Providing embedded design logic 102 that supports triggering allows the exchange to be stopped when the condition occurs and attempts can be made to debug the issue.

For the case of embedded design logic 102 that supports logging, the size impact to the data stream processing device 108 is minimal. For example, it may only require a register the width of the datapath to clock the information out an interface. Once buffered, the information in the data stream processing device 108 can be easily examined.

For the case of embedded design logic 102 that supports, for example, the logic shown in FIGS. 4 and 6, there may be a moderate impact to the size of the data stream processing device 108. However, the additional circuitry of the embedded design logic 102 represents a small percentage of the size of the overall data stream processing device 108. Further, as discussed herein, the full embedded design logic discussed herein provides the ability to start/stop the data stream processing device 108, the ability to insert traffic both out of the PHY of the data stream processing device 108 physical interface and up the system stack, and the ability to edit a particular packet before it is transmitted or sent up the system stack. The ability to stop a test trial before the packet is sent and then insert a new packet allows the user the ability to try different scenarios to see how the design reacts. This "what if" capability provides dramatic improvement in productivity for the developer. The ability to start/stop data stream processing device 108 allows, therefore, real-time capture hardware 104 to regulate flow of the packets of data between network communication channel 110 and the networking stack of processing device 108.

In one embodiment, the controlled client/server 1310 supports a method to bypass the physical layer (PHY) to support the using the product with design emulation systems, such as those from Cadence Design Systems, Inc. of San Jose, Calif.

While specific embodiments and applications of the disclosure have been illustrated and described, it is to be understood that the disclosure is not limited to the precise configuration and components disclosed herein. For example, while the embedded design logic in the target data stream processing device has been discussed as being at a low level of the networking stack, in one embodiment an analogous software module could be placed at a higher level of the networking stack and provide similar capabilities. In such an embodiment, the stop/start capability may be provided by in-circuit emulator tools. Further, such an embodiment may provide display and editing capabilities that are the same as for the lower level embedded design logic, as discussed above.

Thus, various modifications, changes, and variations apparent to those of skill in the art may be made in the arrangement, operation, and details of the methods and systems of the disclosure without departing from the spirit and scope of the disclosure. The scope of the present invention should, therefore, be determined only by the following claims.

What is claimed is:

1. A data stream analysis tool for analyzing a data stream processing device that processes packets of data in a data stream, performs one or both of transmission and receipt of data streams of packets of data, and includes a multi-layer networking stack, one layer of the multi-layer networking stack being a physical interface layer operatively associated with a network communication channel through which packets of data are communicated to and from the physical interface layer, the data stream analysis tool comprising:

real-time capture hardware;

a real-time capture hardware interface operatively associated with the real-time capture hardware and configured for operative association with the data stream processing device to deliver packets of data from the physical interface layer to the real-time capture hardware, the delivered packets of data including one or more packets of data communicated through the network communication channel, and the real-time capture hardware responsive to a processing control command to perform processing of the delivered packets of data in parallel to the processing of packets of data by the data stream processing device;

design logic configured for data communication access to the multi-layer networking stack, the design logic including comparison logic arranged to detect a user-selected value associated with one of the packets included in the delivered packets of data and, in response to detection of the user-selected value, the design logic stopping the communication of the packets of data, thereby allowing the real-time capture hardware to regulate flow of the packets of data between the network communication channel and the multi-layer networking stack; and a data communication system operatively associated with the real-time capture hardware to deliver to the real-time capture hardware user input that selects for analysis one or more of the delivered packets of data.

2. The data stream analysis tool of claim 1, in which the user input causes selective use of the delivered packets of data by at least one of logging the delivered packets of data, displaying for user observation a delivered current packet of data, and displaying for user observation one or more delivered previous packets of data.

3. The data stream analysis tool of claim 1, in which the user input causes selective use of the delivered packets of data by injecting data into the data stream processing device by at least one of modifying a first packet in the data stream of processed packets of data and adding one or more second packets of data to the data stream of processed packets of data.

4. The data stream analysis tool of claim 1, in which the user input causes selective use of the delivered packets of data and other information communicated through the real-time capture hardware interface by at least one of automatically commanding the data stream processing device to continue processing packets of data in the data stream, commanding the data stream processing device to continue processing a user-selected number of packets of data in the data stream, and commanding the data stream processing device to continue processing a user-modified data stream of processed packets of data until the comparison logic detects a next user-selected value.

5. The data stream analysis tool of claim 1, in which the real-time capture hardware comprises trigger logic configured to detect occurrence of a trigger event in the data stream processing device and to produce an external trigger signal for delivery to an external device.

6. The data stream analysis tool of claim 1, in which the real-time capture hardware is in operative association with an external device and comprises trigger logic configured to detect occurrence of a trigger signal received from the external device, and the real-time capture hardware, in response to detection of the trigger signal, causing one or both of logging information about the occurrence and stopping the communication of the packets of data between the network communication channel and the multi-layer networking stack.

7. The data stream analysis tool of claim 1, further comprising a buffer configured to store the packets of data in the data stream whenever the communication of the packets of data is stopped.

8. The data stream analysis tool of claim 1, in which the design logic is further configured to determine whether the data stream processing device maintains a desired gap between packets of data in the data stream.

9. The data stream analysis tool of claim 1, in which the design logic is embedded in the data stream processing device.

10. The data stream analysis tool of claim 1, in which the design logic is implemented in a separate device from the data stream processing device.

11. The data stream analysis tool of claim 1, in which the data communication system includes a computer connection between the real-time capture hardware and a computer system.

12. The data stream analysis tool of claim 1, in which the user input is produced by control/interface software operating on a computer.

13. The data stream analysis tool of claim 1, in which the real-time capture hardware is configured for selectable modification of speed of communication of the delivered packets of data through the network communication channel.

14. A method of analyzing data stream processing by a data stream processing device that performs one or both of transmission and receipt of data streams of data packets, the data stream processing device including a multi-layer networking stack, and one layer of the multi-layer networking stack being a physical interface layer associated with a network communication channel through which packets of data are communicated to and from the physical interface layer, comprising:
receiving from a real-time capture hardware interface for delivery to real-time capture hardware one or more data packets of a data stream communicated through the physical interface layer of the data stream processing device;
causing the real-time capture hardware to process the delivered packets of data in parallel to the processing of packets of data by the data stream processing device;
detecting a user-selected value associated with one of the packets included in the delivered packets of data;
causing, in response to detection of the user-selected data value, design logic configured for data communication access to the multi-layer networking stack to stop communication of the packets of data to allow the real-time capture hardware to regulate flow of the packets of data between the network communication channel and the multi-layer networking stack; and
employing user input to the real-time capture hardware to select for analysis one or more of the delivered packets of data after the communication of the packets of data is stopped.

15. The method of claim 14, in which the user input causes selective use of the delivered packets of data by at least one of logging the delivered packets of data, displaying for user observation a delivered current packet of data, and displaying for user observation one or more delivered previous packets of data.

16. The method of claim 14, in which the user input causes selective use of the delivered packets of data by injecting data into the data stream processing device by at least one of modifying a first packet in the data stream of processed packets of data and adding one or more second packets of data to the data stream of processed packets of data.

17. The method of claim 14, in which the real-time capture hardware comprises trigger logic configured to detect occurrence of a trigger event in the data stream processing device and to produce an external trigger signal for delivery to an external device.

18. The method of claim 14, in which the real-time capture hardware is in operative association with an external device and comprises trigger logic configured to detect occurrence of a trigger signal received from the external device, and the real-time capture hardware, in response to detection of the trigger signal, causing one or both of logging information about the occurrence and stopping the communication of the packets of data between the network communication channel and the multi-layer networking stack.

19. The method of claim 14, further comprising a buffer configured to store the packets of data in the data stream whenever the communication of the packets of data is stopped.

20. The method of claim 14, in which the design logic is embedded in the data stream processing device.

21. The method of claim 14, in which the design logic is implemented in a separate device from the data stream processing device.

22. The method of claim 14, in which the real-time capture hardware is configured for selectable modification of speed of communication of the delivered packets of data through the network communication channel.

* * * * *